United States Patent

[11] 3,617,868

[72] Inventors James E. Beitel
Englewood, Eugene Allen Breitenbach,
Charles R. Bruce, Littleton, Colo.
[21] Appl. No. 831,676
[22] Filed June 9, 1969
[45] Patented Nov. 2, 1971
[73] Assignee Marathon Oil Company, Findlay, Ohio

[54] RESISTIVITY CELL INCLUDING A GROUNDED SHIELD FOR LIQUID-SOLID MIXTURES
11 Claims, 6 Drawing Figs.
[52] U.S. Cl............................................... 324/13,
324/64
[51] Int. Cl............................................... G01n 27/04
[50] Field of Search........................................... 324/13, 14, 64

[56] References Cited
UNITED STATES PATENTS
2,745,057  5/1956  Dotson........................... 324/13
2,786,977  3/1957  Blagg et al..................... 324/13 X
2,821,680  1/1958  Slusser et al................... 324/13

*Primary Examiner* — Gerard R. Strecker
*Attorneys* — Joseph C. Herring and Richard C. Willson, Jr.

ABSTRACT: The resistivity of drilling fluid components, e.g. mud solution, mud cake, and mud filtrate water, are determined using a pressurized and heat controlled cylindrical cell to simulate bore hole conditions. The cell has an upper mud receiving portion separated from a lower mud filtrate receiving portion by a porous partition upon which mud cake deposits. Three sets of electrodes, preferably the four electrode type, extend into each of the mud, mud cake, and mud filtrate receiving portions, so that upon application of current, across the two outer electrodes in each of the three systems and upon taking a voltage reading across the two inner electrodes of each of the three systems, the resistivity of the mud, mud cake, and mud filtrate, may be determined. Knowledge of these resistivity values is helpful in further determining subterranean formation parameters, such as fluid saturation, porosity, and permeability.

3,617,868

INVENTORS
J.E. BEITEL
E.A. BREITENBACH
C.R. BRUCE

ATTORNEY

Fig. 3
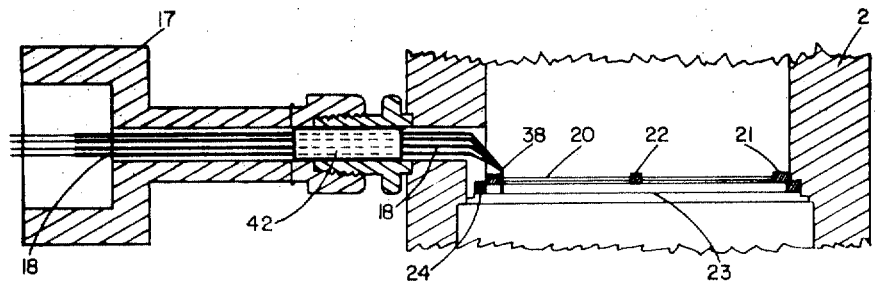
Fig. 4
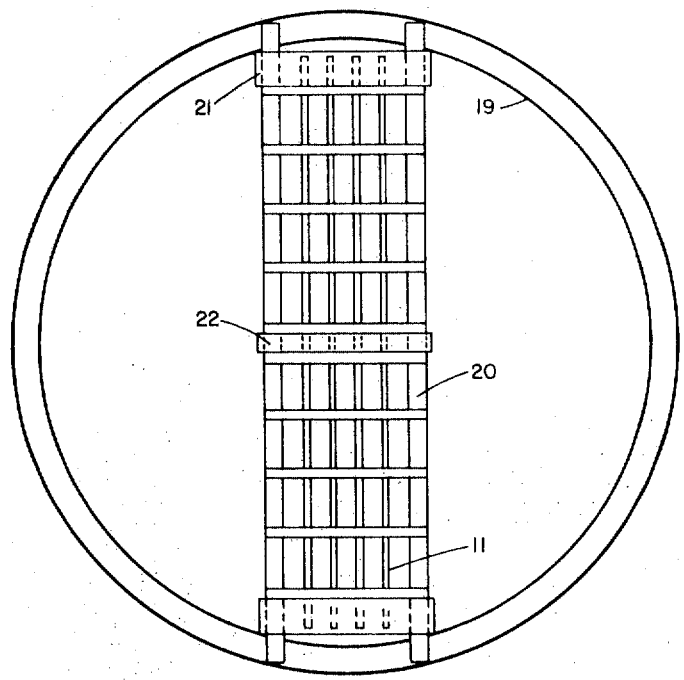
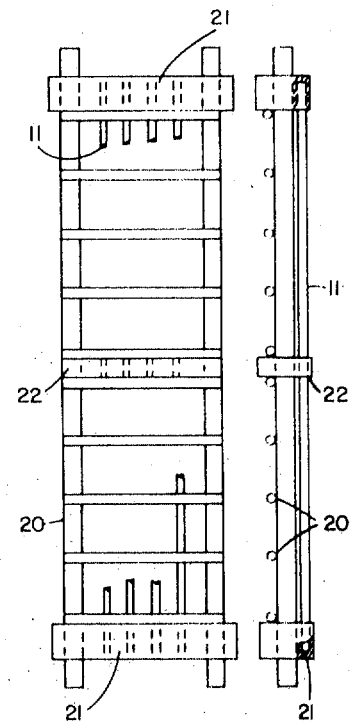
Fig. 4a      Fig. 4b

3,617,868

RESISTIVITY CELL INCLUDING A GROUNDED SHIELD FOR LIQUID-SOLID MIXTURES

BACKGROUND OF THE INVENTION

In the recovery of hydrocarbons, oil well drilling is facilitated by using drilling muds which serve in part to reduce water loss into the formations being penetrated. Drilling muds have further utility in providing a method of characterizing the formation and thus giving the operator an indication of the feasibility of the production of oil from the well. More specifically, the mud and mud components in the bore hole are part of the electrical path for electric logging tools. The important parameters of porosity and permeability of the formation can be determined once certain characteristics of the drilling mud, mud cake (which forms on the well bore surface), and mud filtrate (which permeates the formation) are determined. Specifically, mud cake thickness and resistivity of the mud, mud cake, and mud filtrate are important parameters which need to be determined.

The general practice in making mud cake measurements has been to make a mud cake from a sample of the mud, and to test it under atmospheric pressures and surface temperatures. Mud cake resistivity measurements made under these nonbore hole conditions are subject to a high degree of error. This is also true of the measurement of resistivity of the mud and mud filtrate components. An apparatus is needed which will give true resistivity measurements under simulated bore hole conditions.

U.S. Pat. No. 2,821,680 to Slusser et al. shows a device which can simulate reservoir pressure and temperature, but utilizes no porous barrier for separating mud components and is actually designed for determining the resistivity of consolidated rock samples.

The closest art known to the inventor is the Society of Petroleum Engineers' paper No. 1302-G, titled "Effect of Temperature on Drilling Mud Resistivities," By R. D. Lynn. The mud cell described in this paper operates under 100 p.s.i. pressure (substantially less than normal differential pressure existing across a bore hole interface) and bore hole temperatures. However, no grounded shield surrounds the electrodes imbedded in the mud cake to prevent current "leak" into the less resistant mud. This current leak can cause a severe error in the resistivity measurement of the mud cake as measured by the voltage meter reading across the imbedded electrodes. In the present invention a grounded shield surrounds the electrodes to prevent current leak and greatly improves resistivity measurements.

DESCRIPTION OF THE INVENTION

Disadvantages of the prior art are overcome by using the mud cell of the present invention. The invention will be more fully understood by reference to the accompanying drawings in which:

FIG. 3 is an enlarged side view of the mud cake cell assembly of FIG. 1; and

FIGS. 4, 4a and 4b show a detailed view of the grounded grid mesh wire 20 of FIG. 1.

Figure 1:
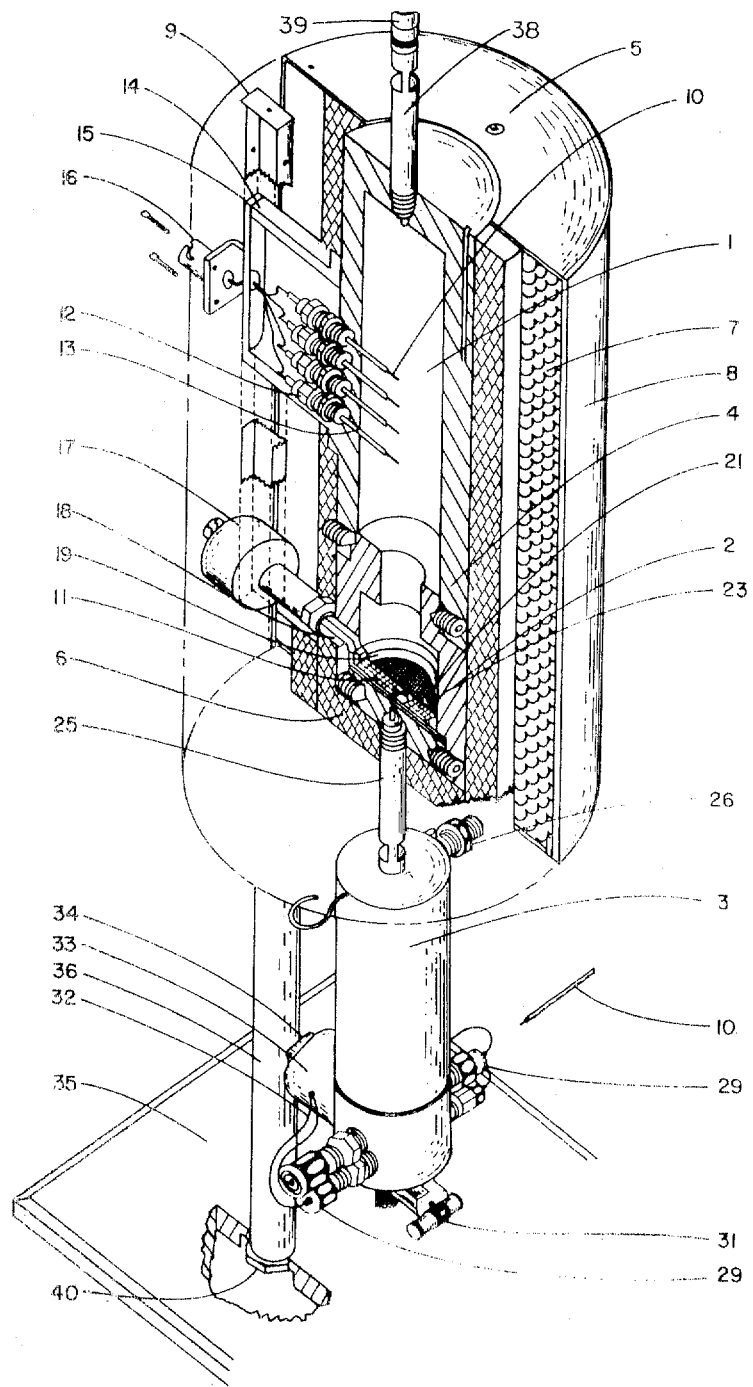
FIG. 1 is an isometric, partial cutaway, partial section of the mud cell arrangement.

Referring to the figures, the mud filtrate cell consists of three sections, the mud receiver 1, the mud cake receiving cell 2, and the filtrate water receiver 3. The mud and mud cake receiver cells are held together by setscrews and separated by sealing means provided by O-ring 4. These cells are easily detachable to facilitate cleaning. Both cells are also confined in a heating unit consisting of heater well top 5, heater well base 6, insulation 7, and cylindrical heater well cover 8. A slot provided with frame cover 9 vertically extends along one side of the cylindrical cell for positioning of outlet plugs carrying wires from the electrodes 10 and 11. The receiving cells are made of stainless steel and the electrodes of 303 stainless steel (highly resistant to chloride solutions). Four electrodes 10 penetrate the mud cell 1 so that the ends lie in a vertical line along the axis of the cell. The electrodes fit in Teflon tubing 13 which in turn is received by pressure sealing male connectors 12 inserted in electrode cover 14, plate 15, to plug 16. Wires from the outer current electrodes are connected to an alternating current generator not shown. The inner two electrodes are potential electrodes and are connected to a voltmeter for readout, not shown.

Four parallel electrode wires 11 extend into the mud cake cell 2 via cake cell adapter plug 17, and are inserted in Teflon tubing 18. The plug 42 forms a pressure tight seal. The wires from the Teflon tubing are joined 38 to the electrode wires 11 at one end by welded connections. As in the case of the mud cell electrodes, the outer two wires are connected to a current generator and the remaining two wires are potential wires connected to a voltmeter. Inside the cylindrical mud cake cell is an electrode ring 19 and just above the electrode wires 11 is a grounded grid wire 20 both of which are grounded to the cell wall. Insulating end blocks 21 and insulating center block 22 prevent grounding of the electrodes. Below the electrodes 11 is a bottom seal plug (not shown) carrying filter paper 23. The entire unit is hermetically sealed with the base by O-ring 24.

Figure 2:
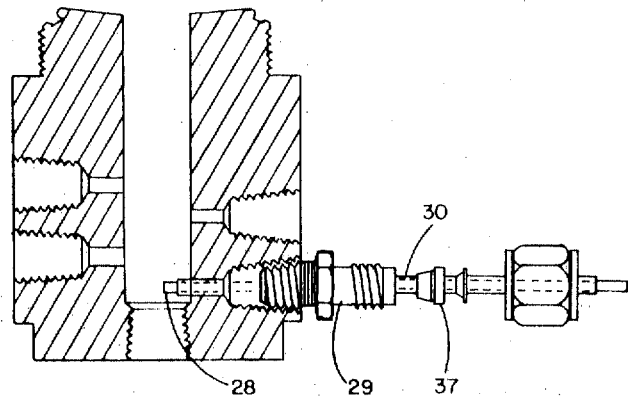
FIG. 2 is the cross-sectional view of the preferred four electrode system used in determining the resistivity of the filtrate.

The filtrate water receiver 3 is in sealed fluid communication with the mud cake cell 2 via valve stem 25. The filtrate water cell assembly is penetrated by four electrodes similarly as in the mud cell. In FIG. 2, the four opposing electrodes (one shown) 28 are each inserted in Teflon tubes 30, pressure sealed by male connectors 29 and ferrule 37 and in communication with the exterior of the cell. The outer electrodes, that is, the upper left and lower right electrodes are the current electrodes and the inner electrodes are the potential electrodes for readout. Wires 32 from the electrodes pass through cell adapter cylinder 33 to plug 34. Extraction of filtrate water is controlled by drain valve 31. The entire three section cell assembly is mounted on heater well base 35 supported by rod 36 secured to the base by hex-nut 40.

At the top of the vessel, the vessel is pressurized with nitrogen from a nitrogen tank (not shown) through valve stem 38 sealed by O-ring 39. Also not shown is the temperature controller for the heating unit which consists of two stripheater elements mounted to a heavy-walled aluminum cylinder to distribute the heat. The insulation 7 is protected by the stainless steel outer shell. A thermistor (not shown) for sensing the temperature of the aluminum cylinder terminates at the cable connector (not shown) of the lower part of the heater.

In operation of the cell, drilling fluid is placed in the mud cell 1 and mud cake cell 2 is connected to mud cell 1. Cell 1 is filled until the electrodes 10 are completely covered, but usually some space should be left in the top of the mud cell for expansion of the mud due to heating. After inserting cells 1 and 2 into the heating unit 5,6,7, and 8, the known bore hole pressure condition obtained from the drilling operations at the well site is simulated by the use of two pressure regulators and compressed nitrogen inletting through valve stem 38 and connector 26. Typical differential pressures are from 500 to 2,000 p.s.i.g. Filter paper[1] 23 is placed in the mud cake cell and serves to separate mud buildup from filtrate which flows downward into the filtrate cell 3. Filter paper may seem a crude approximation of a well bore formation material, but filter paper has a permeability nearly the same as the average formation, and results obtained using this simulating apparatus are excellent.

[1] For example, Whatman's No. 50 as set forth in the *Standard Procedure for Testing Drilling Fluids*, American Petroleum Institute, 1962. p. 8.

Drilling fluid temperature or bottom-hole temperature is also known to the operator. This fluid temperature is attained in the mud cell by a controlled heater assembly which surrounds the mud cell as described above. Any temperature in the operating range of the heater can be preselected and then automatically controlled for a particular mud measurement.

Even though mud cake thickness and filtrate volume measurements are taken, the most important measurement for formation evaluation is the resistivity of the mud, mud cake, and mud filtrate. This measurement is obtained by reading by the potential difference between the inner electrodes respectively of the mud cell, mud cake cell, and mud filtrate receiver cell unit. The resistivity value is directly proportional to the potential difference between the electrodes and inversely proportional to the current across the electrodes. The proportionality constant or cell constant is dependent upon the cell geometry and will remain constant for any given cell so long as the geometry is maintained, i.e. the spacing between the electrodes is maintained, the distance between the electrode wires and grounded grid wires in the mud cake receiver cell is maintained, etc.

The cell is calibrated by pouring solutions of known resistivity into each cell, and measuring the voltage for each solution using a constant current. By using a set of these standard solutions, with a range of resistivities, interpretation tables or graphs are obtained. These interpretation tables or graphs relate the measured voltage to the known resistivity. Once these tables are computed or curves are plotted, the operator is equipped to determine the resistivity of any fluid material of unknown resistivity by simply correlating the voltage output across the inner electrodes with the corresponding resistivity value in ohm-meters provided by the graphs or interpretation tables.

It has been found that resistivity measurements made with this mud cell normally are accurate to within a few percent of the actual value.

It has also been found that resistivities in the mud cake cell 2 are correct for the mud cake only when the grounded grid wire 20 is employed as a shield, to prevent current paths in the material in the mud cell portion above. Without the grounded grid wire, the resistivity value includes the material in the mud cell, as well as the material on the filter paper, e.g. mud cakes.

The above description of this invention is merely illustrative of a preferred embodiment and is not meant to limit the invention in any way. There are a variety of modifications and variations which will become apparent to those skilled in the art upon a reading of the specification. For instance, it is equally desirable to have the mud cell 1 and mud cake cell 2 one entire unit, rather than two separate units secured together. There are also a variety of additional ways to heat and pressurize this mud cell. For instance, the entire mud cell could be subjected to a radiant heat environment, such as that provided by an oven, so that the filtrate water receiver 3 would be heated just as the upper unit is. However, this is not necessary since resistivity vs. temperature correction tables exist for saline waters and simple corrections can be made from these tables.

Although nitrogen compression is a very satisfactory way of pressurizing the vessel, a simple piston rod such as described in R. D. Lynn's paper, cited above, would also be applicable in this invention. Although not preferred, it is also possible to use two electrode systems instead of the four as described. Furthermore, the cell can be used to measure the resistivity of various solid-liquid mixtures where temperature and pressure conditions must be simulated. A person skilled in the art would realize the applicability of the above mentioned modifications as well as others, and the invention should be limited in scope only as to the appended claims and equivalent embodiments thereof.

What is claimed is:

1. A cell for determining the resistivity of at least one component of a liquid-solid conditions in which the mixture is found are simulated said cell comprising:
   1. a chamber for receiving the mixture,
   2. filter means connected to the chamber for receiving the substantially solid component as a deposit on a first side of said filter
   3. a plurality of electrodes located in said chamber on said first side of said filter in spaced relationship with said filter, said electrodes penetrating the substantially solid deposit, and
   4. a grounded shield located in said chamber on said first side of said filter and spaced further from said filter than are said electrode means penetrating the solid deposit so as to maintain current substantially entirely within the solid deposit for accurate resistivity determination, and
   5. electrical means for determining the electrical potential between said electrodes.

2. The apparatus of claim 1 wherein the liquid-solid mixture is well-drilling mud and where the substantially solid deposit is mud cake.

3. The apparatus of claim 1 wherein the electrode means are comprised of four electrodes wherein current is induced across the outer two electrodes and the electric potential is measured across the inner two electrodes.

4. The apparatus of claim 2 wherein external pressure and heat control means simulate well bore hole conditions from which the drilling mud is taken.

5. A filter cell for determining the resistivity of at least one component of a liquid-solid mixture said cell comprising:
   1. an upper chamber which receives the mixture and current and electrode means for determining the potential difference across electrodes penetrating the mixture in the chamber,
   2. a lower chamber for receiving liquid filtrate and current and electrode means for determining the potential difference across electrodes penetrating the liquid in the chamber,
   3. filter means between the said upper and lower chambers for receiving the substantially solid component as a deposit and allowing liquid to flow through to the lower chamber,
   4. electrode means located in spaced relation to said filter means and located on the first side of said filter means for determining the potential difference across electrodes penetrating the substantially solid deposit,
   5. a grounded shield located on said first side of said filter means and spaced further from said filter means than are said electrode means, so as to maintain current substantially entirely within the solid deposit for accurate resistivity determinations.

6. The apparatus of claim 5 wherein all three sets of electrodes comprise four electrode systems wherein the outer electrodes are current carrying electrodes and the inner electrodes are used for potential difference measurement.

7. The apparatus of claim 5 wherein the upper chamber and middle chamber are thermally controlled separately from the lowest chamber.

8. The apparatus of claim 5 wherein pressure is maintained and controlled by nitrogen compression means.

9. The apparatus of claim 5 wherein the liquid solid mixture is well-drilling mud and where the substantially solid deposit is mud cake.

10. The apparatus of claim 5 wherein external pressure and heat control means simulate well bore hole conditions from which the drilling mud is taken.

11. A filter cell for determining the resistivity of at least one component of a liquid-solid mixture wherein the natural temperature and pressure conditions in which the mixture is found are simulated within the cell, said cell comprising:
   1. an upper chamber portion which receives the mixture,
   2. a lowest chamber portion for receiving liquid filtrate,
   3. a middle chamber portion, having filter means for receiving the substantially solid component as a deposit on a first side of said filter means connecting and being in fluid communication with the upper and lower chamber portions,
   4. means for controlling the temperature in the upper and middle chamber portions,
   5. means for controlling the differential pressure across the substantially solid deposit within the middle chamber, 6. three sets of electrode means in spaced relation penetrating respectively, the mixtures in the upper chamber portion, the substantially solid deposit in the middle chamber portion, and the filtrate in the lowest chamber, each of said sets comprises inner and outer electrodes and wherein the outer electrodes in each chamber portion function as current carrying electrodes and the inner electrodes function as potential difference measuring electrodes, 7. measuring means for connection to said electrodes for determining the resistivity of each of the mixture, substantially solid deposit, and filtrate by relating measured potential difference and known current values, 8. a grounded shield located on said first side of said filter means and spaced further from said filter means than are said electrode means, so as to maintain current substantially entirely within the solid deposit for accurate resistivity determinations.

* * * * *